(No Model.) 7 Sheets—Sheet 4.
O. W. SCHAUM.
SWIVEL LOOM.

No. 493,652. Patented Mar. 21, 1893.

WITNESSES: INVENTOR:
Joshua D. Mackach, Jr. Otto W. Schaum
David S. Williams

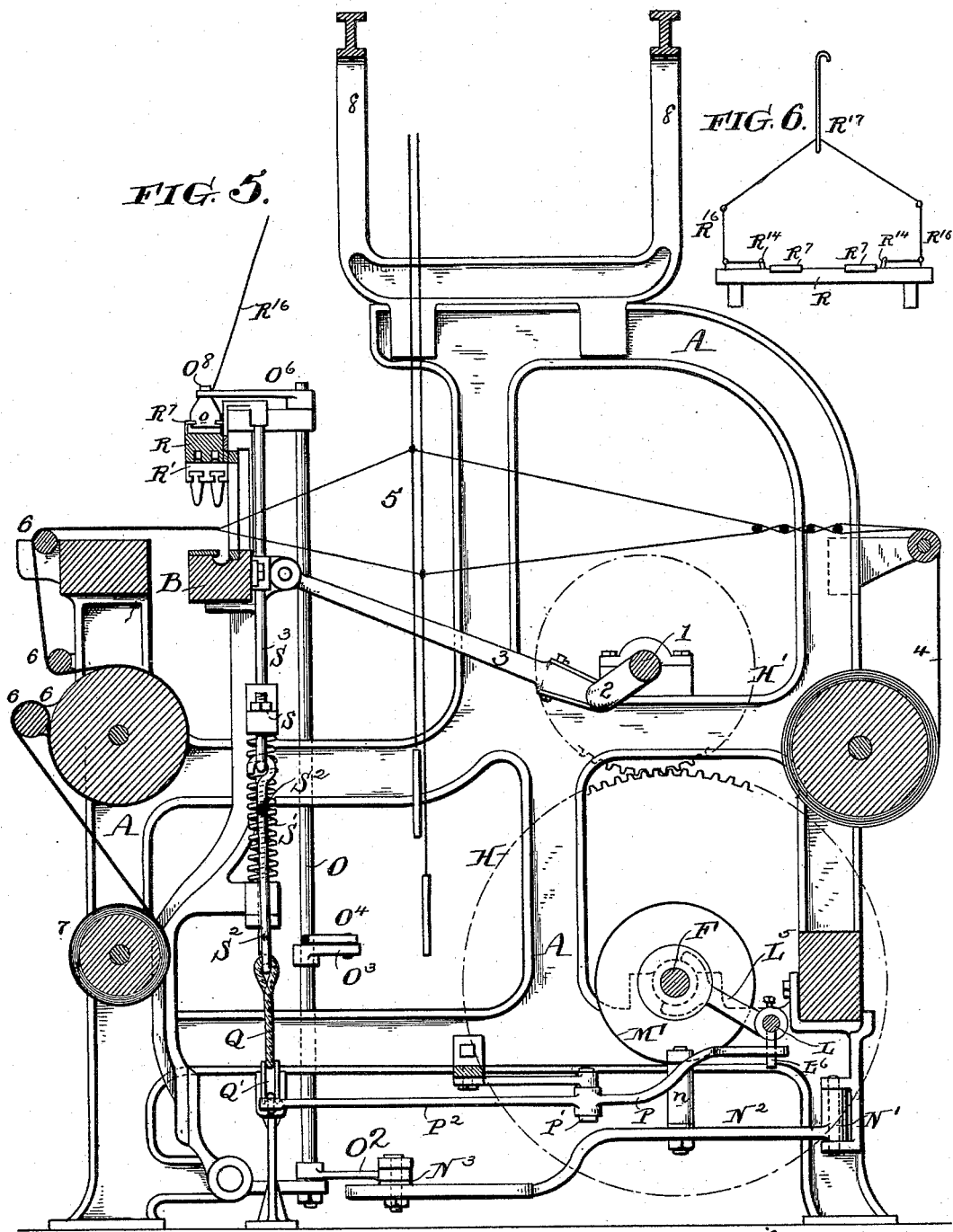

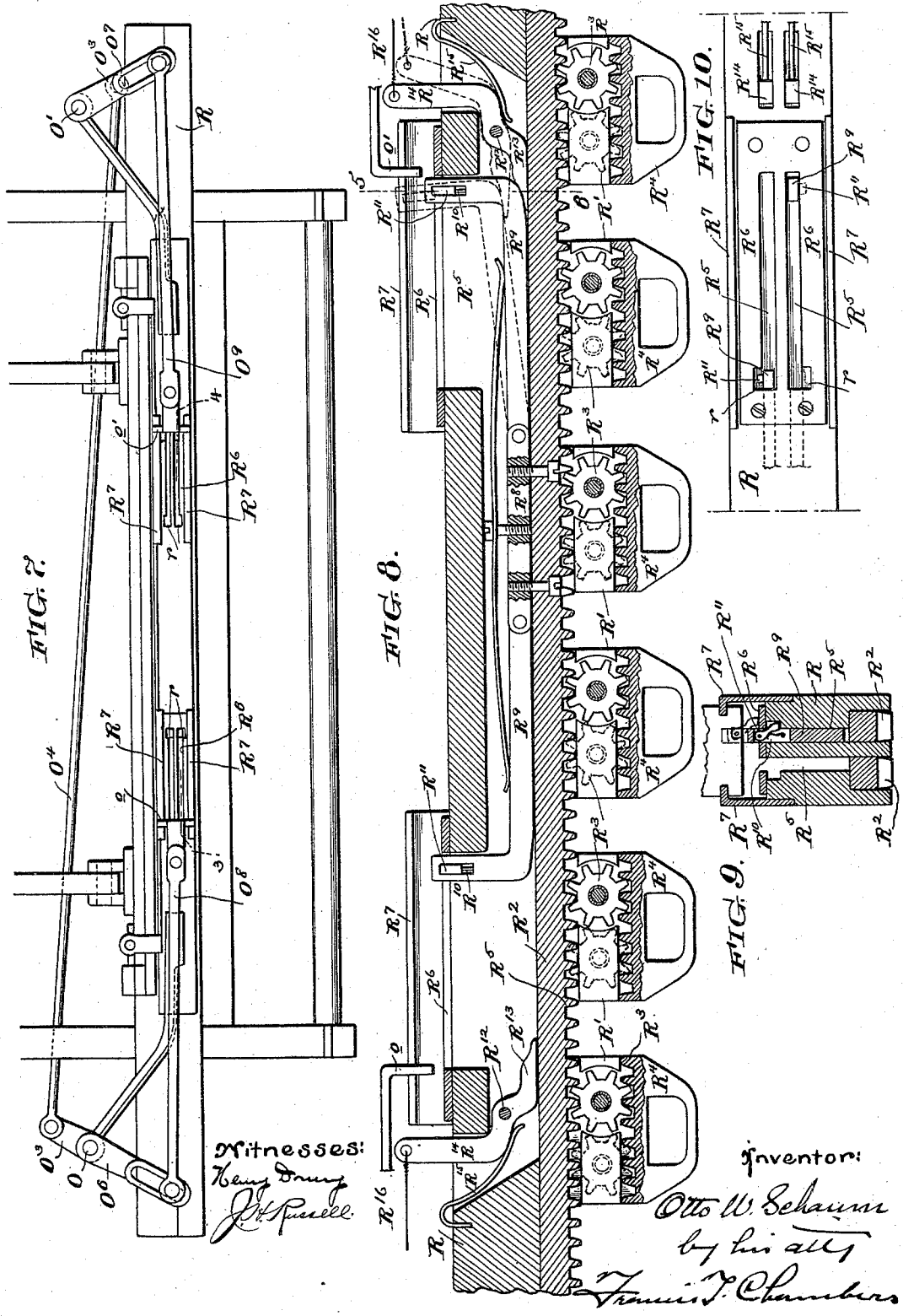

(No Model.) 7 Sheets—Sheet 7.
O. W. SCHAUM.
SWIVEL LOOM.
No. 493,652. Patented Mar. 21, 1893.
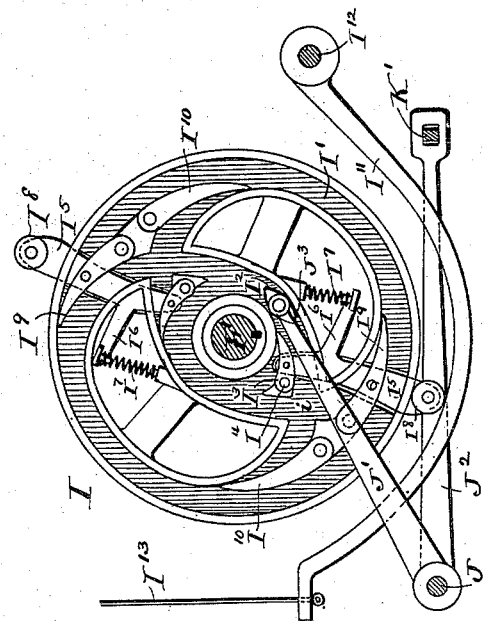
FIG. 11.
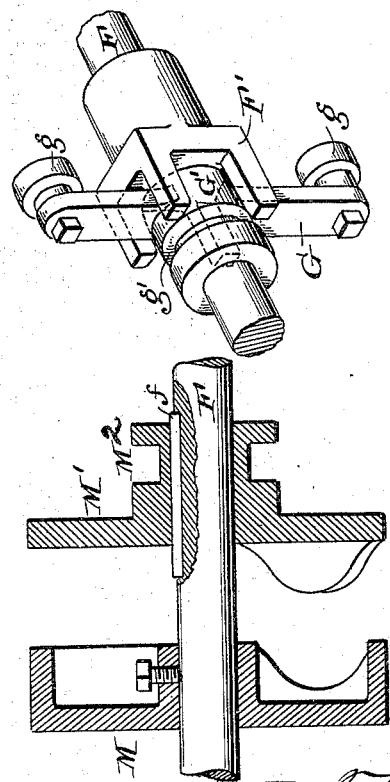
FIG. 12.
FIG. 13.
Witnesses:
Inventor:
Otto W. Schaum
by his atty.

UNITED STATES PATENT OFFICE.

OTTO W. SCHAUM, OF PHILADELPHIA, PENNSYLVANIA.

SWIVEL-LOOM.

SPECIFICATION forming part of Letters Patent No. 493,652, dated March 21, 1893.

Application filed August 11, 1891. Serial No. 402,339. (No model.)

*To all whom it may concern:*

Be it known that I, OTTO W. SCHAUM, of the city and county of Philadelphia, State of Pennsylvania, have invented a certain new and useful Improvement in Swivel-Looms, of which the following is a true and exact description, reference being had to the accompanying drawings, which form part of this specification.

My invention relates to that class of looms known as swivel looms in which, in addition to the ground or fly shuttle or shuttles, a number of swivel-shuttles are provided and brought into operation at intervals.

The object of my invention is to so construct the loom that the swivel shuttles may remain in operation for any desired number of picks and that while in their operative position the ground shuttle will remain inoperative. And this I accomplish by providing mechanism for throwing the fly-shuttle-actuating new and simple mechanism out of operation and holding it out of operation at the same time drawing the swivel-shuttles-supporting bar into and holding it in operative position.

My invention will be best understood as described in connection with the drawings in which it is illustrated and in which,—

Figure 1:
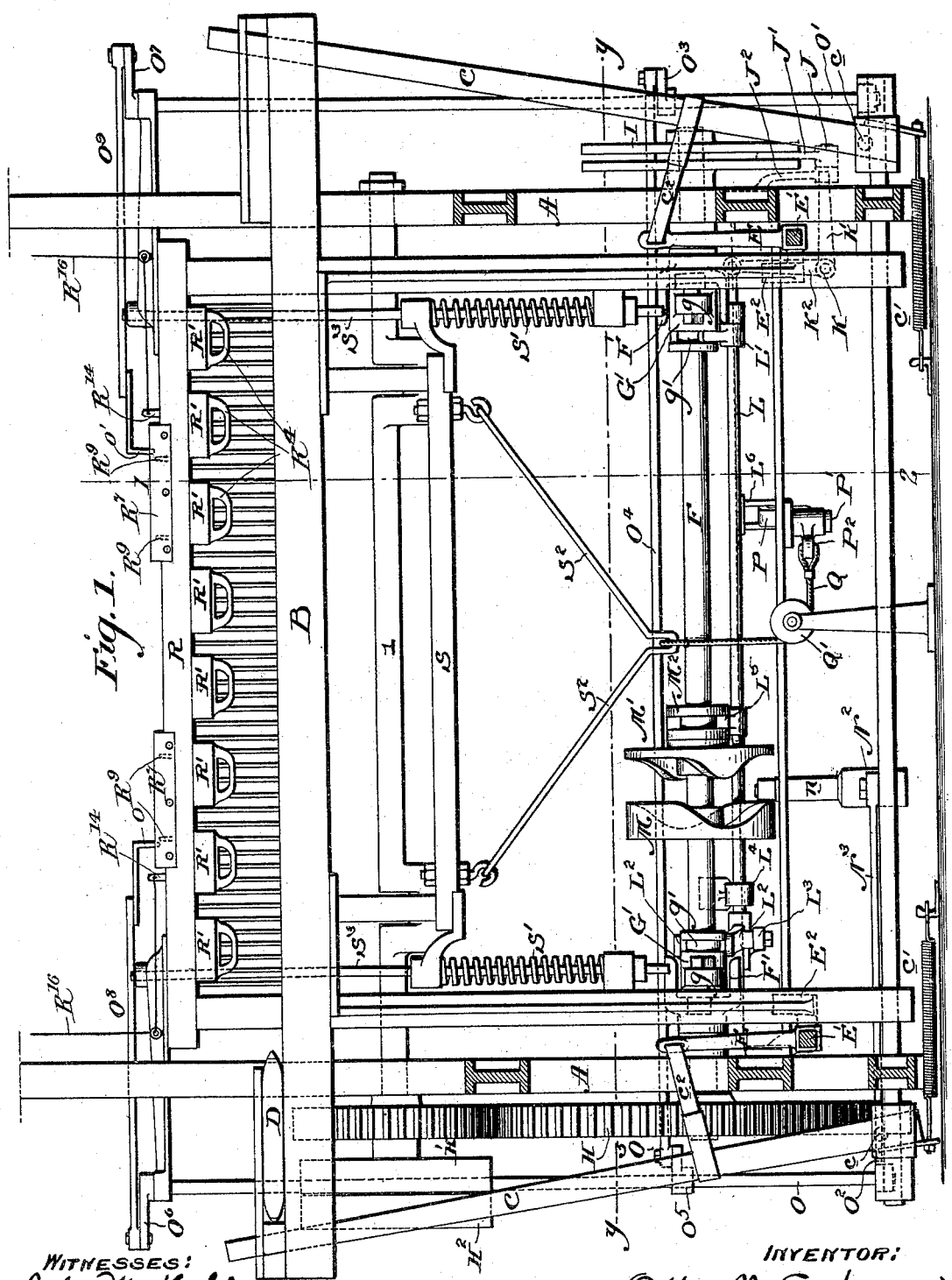
Figure 2:
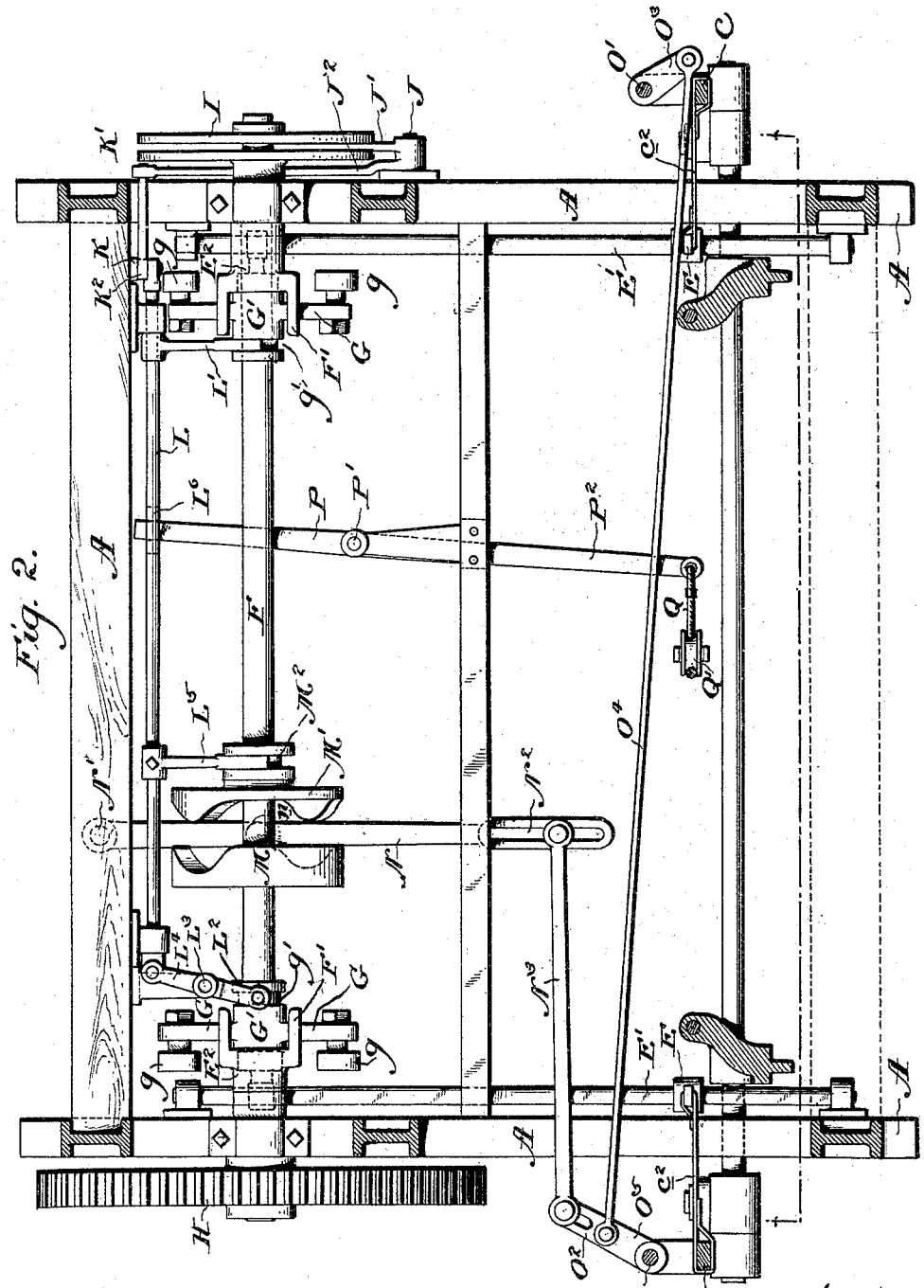
Figure 3:
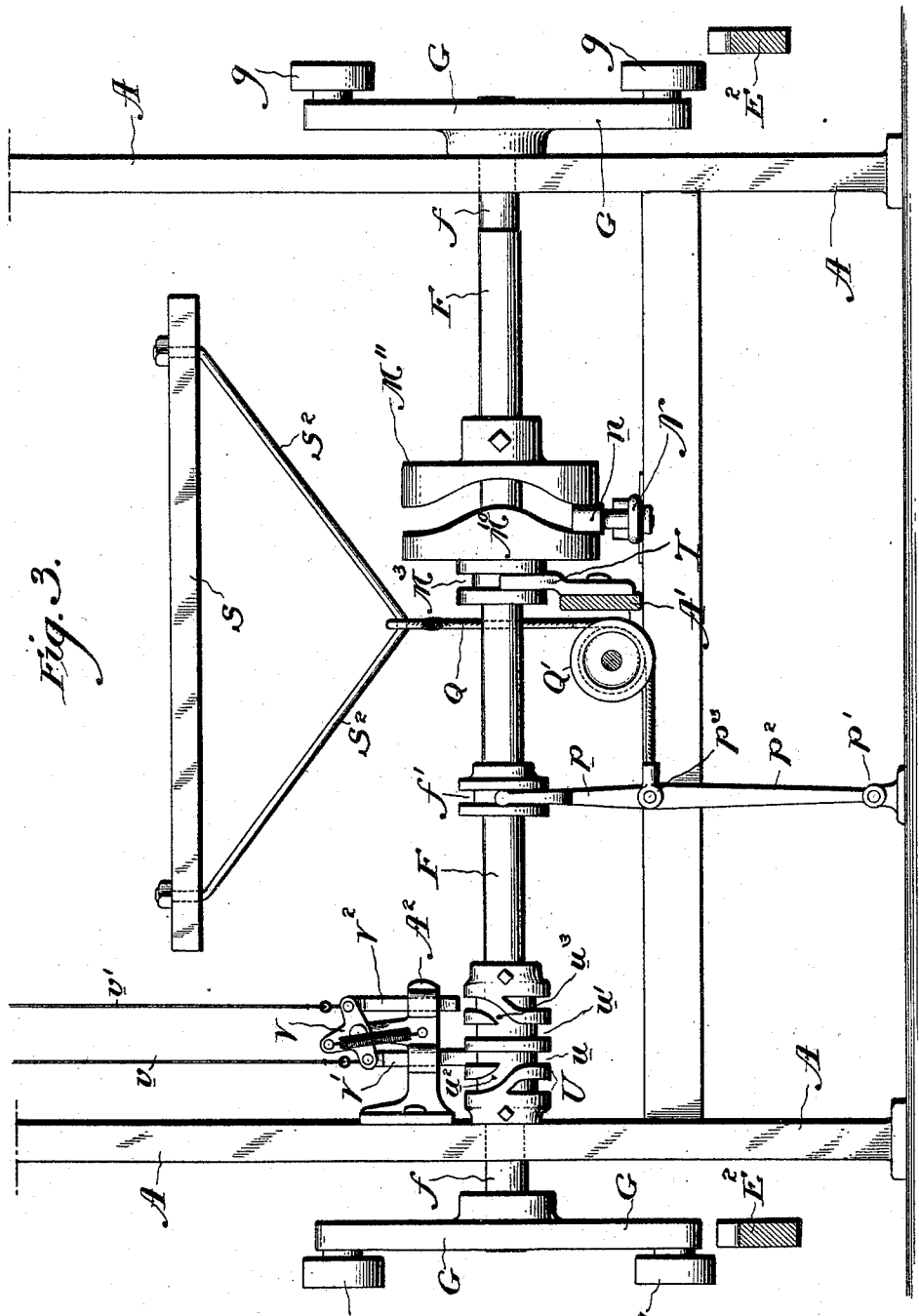
Figure 4:
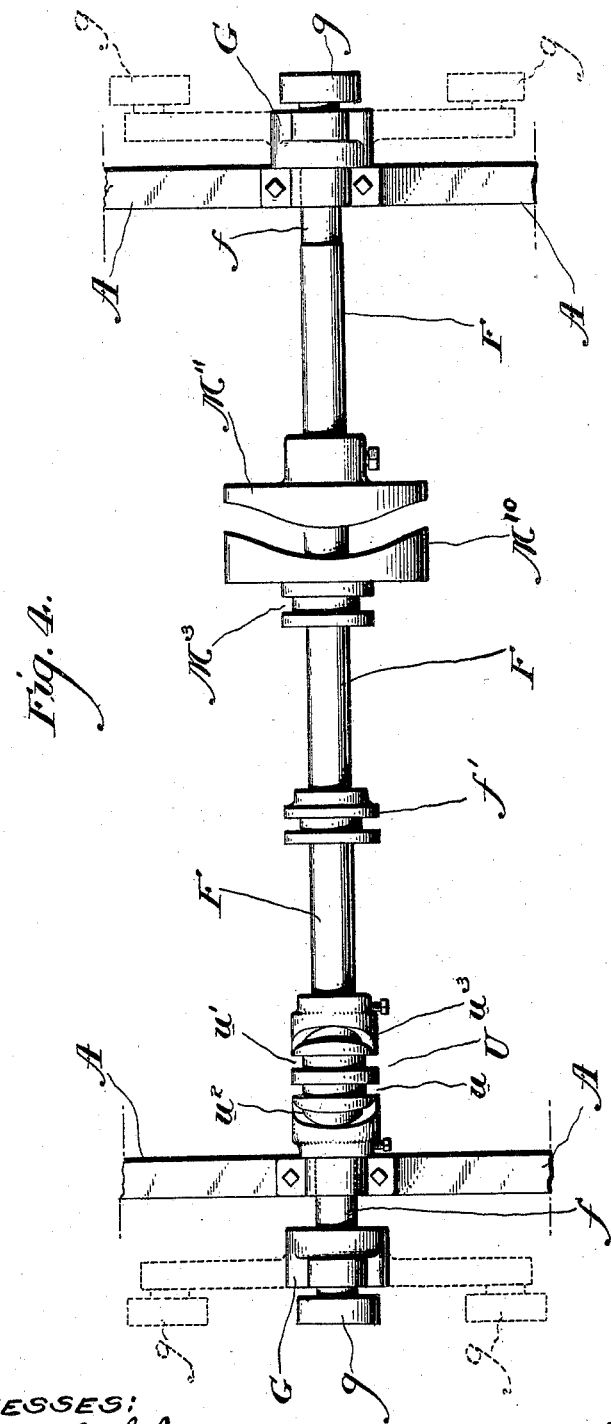

Figure 1 is a sectional elevation of a portion of a loom embodying my invention, Fig. 2 a plan view on the section-line $y\ y$ of Fig. 1, Fig. 3 an elevation illustrating a modification of my device; Fig. 4 a plan view showing a portion of the mechanism illustrated in Fig. 3. Fig. 5 is a sectional side elevation of the loom on line 1—2 of Fig. 1, Fig. 6 a view illustrating the connections which actuate the lifters. Fig. 7 is a plan view on a larger scale of the beam supporting the swivel shuttles and some of its connected mechanism. Fig. 8 is a sectional elevation on a larger scale taken on the line 3—4 of Fig. 7. Fig. 9 is a cross section on line 5—6 of Fig. 8, Fig. 10 an enlarged plan view of a portion of the beam, Figs. 11, 12 and 13 views showing details of the mechanism.

A is the frame of the loom; B the lay in which is the ground shuttle race; C C the pick levers pivoted at $c$ having springs $c'$ arranged to hold them in the position shown in Fig. 1, and straps $c^2$ by which they are connected with their actuating levers.

D is the ground shuttle; E E lever-arms to which the straps $c^2$ are attached and which are secured on rock-shafts E' E'.

$E^2\ E^2$ are projecting levers extending out from shafts E' in the path of the bowls.

F is a shaft having a gear-wheel H secured to it, said gear-wheel being engaged with a gear H' and $H^2$ being a pulley secured on the same shaft as gear H' and by which motion is given to the loom.

F' F' are forks secured on shaft F between which extend the bowl levers G G which extend out from a hub G' supported on and longitudinally movable along the shaft F—$g\ g$ being the bowl rollers which move normally in a path in which the end of the arm or lever $E^2$ lies and which, as they rotate with shaft F, strike alternately on the arm $E^2$ giving an oscillating movement to the shaft E' which is transmitted to the pick levers through the mechanism already described.

I indicates a switch cam the construction of which is shown in Fig. 11. It is secured on a shaft F and is provided with concentric channels I' and $I^2$ connected as shown at $i\ i$ by crossing channels and provided with switches $I^9\ I^{10}$ and $I^3$; the switches $I^9$ and $I^3$ on each side are pivotally connected with a rod or bar $I^5$ and normally pushed out by a spring $I^7$ acting against an arm $I^6$ of bar $I^5$; on the other end of said bar is a roller $I^8$. A runner $J^3$ moves in the grooves of cam I and is connected with the arm J' of a bell crank lever J' $J^2$ pivoted at J and the arm $J^2$ of which actuates the arm of lever K' $K^2$ which in turn moves rod L. As long as runner $J^3$ rests in either of the concentric slots the rod L remains at rest, and when it is desired to shift it, it is necessary to move the switches $I^3\ I^9$, thus to cause runner $J^2$ to move to the outer groove, shoe $I^{11}$, pivoted at $I^{12}$, is drawn up by a cord $I^{13}$ actuated by the jacquard (not shown) and acting on rod $I^5$ moves the switches to the position shown in Fig. 11 so that the runner will ride under switch $I^3$ and over switch $I^{10}$ into channel I', the action of spring $I^7$ shifts the switches as soon as the jacquard releases shoe $I^{11}$ and the runner is then thrown into groove $I^2$.

The device above described is not my invention and is shown simply as one and a good instance of a device to actuate rod L. It will be obvious that any convenient device may be used for this purpose, also that motion may be given by hand.

J' J$^2$ is as stated a bell-crank lever pivoted at J, the arm J' being engaged with cam I and the arm J$^2$ engaged with a second bell-crank lever K' K$^2$; the connection being with the end of the arm K' and the lever being pivoted at K. The other arm, K$^2$, of the lever is pivotally secured to the shifting rod L which is longitudinally movable in proper bearings and has extending out from it an arm L' which engages with a groove $g'$ on the bowl hub G' to the right in Figs. 1 and 2, while the bowl hub to the left is engaged by the pivoted lever L$^2$ L$^4$—the arm L$^2$ being forked and engaged with a groove $g'$—the lever being pivoted at L$^3$ and its arm L$^4$ pivotally connected with the rod L. By reason of the described construction it is of course evident that whenever the rod L is moved to the left it will move both of the bowls toward the center and out of operative position with regard to the arms E$^2$ while a movement of the rod L back to the right will bring the bowls back to the position shown in the drawings (Figs. 1 and 2).

M M' is a cam secured on shaft F; in the arrangement shown in Figs. 1, 2 and 13 the part M is permanently attached to shaft F and the part M' longitudinally movable thereon though keyed so as to turn with it as shown at $f$ Fig. 13. A grooved collar or hub M$^2$ of the part M' is engaged by the arm L$^5$ extending out from rod L so that whenever the rod is shifted to the left the part M' is thrust toward the part M and the cam becomes operative; while a movement of rod L to the right opens the cam as shown in Figs. 1 and 2 throwing it out of operation.

N is a lever pivoted at N' and having a slotted end N$^2$. By means of an upright $n$ this lever is connected with a part under the operation of the cam M M'. From the end of lever N a connecting rod N$^3$ extends to a lever arm O$^2$ attached to the vertical rock-shaft O; and by means of a lever arm O$^5$ attached to shaft O and a connecting-rod O$^4$ motion is communicated to a rock-shaft O' on the other side of the machine through a lever-arm O$^3$ to which rod O$^4$ is attached—the arrangement being such that the motions of the shafts O and O' are simultaneous but in opposite directions. Lever-arms O$^6$ and O$^7$ at the tops of rods O and O' communicate motion to rods O$^8$ and O$^9$ which serve as the pick levers of the swivel-shuttles.

I may here state that the mechanism described in my application for an improved swivel loom filed May 20, 1891, Serial No. 393,475, is particularly well adapted for use with the mechanism described and is as follows see Figs. 7 to 10. The beam R. carrying the shuttle blocks R' is provided with reciprocating racks R$^2$ R$^2$ in number equal to the number of rows of swivel shuttles and arranged as shown at Fig. 8 so that when the rack moves it will rotate spur wheels R$^3$ which in turn engage racks on the shuttles R$^4$ causing them to move across the space between adjoining blocks R'. In slots or grooves R$^5$ cut in the beam R, above the racks, extend rods R$^9$ pivotally secured to the racks R$^2$ and having turned up ends which extend above the top of the beam through slots in a face plate R$^6$, on top of the beam, these slots have extensions $r$ at their inner ends and in openings R$^{10}$ of the rods R$^9$ are secured catches R$^{11}$ which, when the rod R$^9$ is raised, catch on the face plate R$^6$ and hold the rods up until their ends are moved into recess $r$ through which the catch R$^{11}$ can fall and does so, a spring being preferably used to aid the weight of rods R$^9$ in moving and holding them down. The said rods are moved up by lifter levers R$^{13}$ R$^{14}$ pivoted at R$^{12}$ so that their ends R$^{13}$ will extend beneath the end of rod R$^9$ in its outer position and normally held so by a spring R$^{15}$. Cords R$^{16}$ R$^{17}$ see Fig. 6 which are actuated by the jacquard, moves the levers at proper times, throwing the desired rod R$^9$ up to operative position. The ends of rods R$^9$ are, when elevated, in the path of wipers $o$ $o'$ which move on guides R$^7$ and are actuated by the rods O$^8$ and O$^9$ which in turn are moved by levers O$^6$ and O$^7$ on rods O and O'.

As the above described portion of my loom forms the subject matter of my said other application, I do not claim it in this case.

P P$^2$ is a lever pivoted at P' its end P being connected with rod L by a loop L$^6$ while to its end P$^2$ is attached a cord Q which, passing under a pulley Q', is attached to a yoke S$^2$ which extends down from a beam S to which it is attached. This beam is permanently attached and connected with the swivel-shuttle-carrying bar R and the said bar is held normally out of operative position and above the shaft by springs or weights;—in the plan shown springs S' S' perform this function.

Before describing the modified construction shown in Figs. 3 and 4 I will call attention to the operation of the device already described. It will be seen that whenever the bar L moves to the left in order to perform its function of moving the picking bowls out of operative position and thus disconnecting the pick mechanism which operates on the ground shuttle, the lever P P$^2$ will also be moved in such a way that it will pull down the cord Q and through it the swivel-shuttle-supporting bar bringing it into operative position within the shed 5 Fig. 5 and holding it there as long as the mechanism for operating the ground shuttle is out of operation;—at the same time that the swivel-shuttle-supporting bar is drawn to operative position the cam M M' is closed and made operative and thus by the devices already described the mechanism for operating the swivel-shuttles is brought into play. It is obvious of course that a movement of bar L to the right opens the cam M M' and also permits the bar or beam R to rise lifting the swivel-shuttle R' R', &c., above the shed.

I have already referred to the shed marked 5 in Fig. 5, and will here call attention to the warp beam 4 and the take up rolls 6, 6, 6, 6, and cloth roll 7 which are of usual construction, as is also the rod 3 connected to a crank 2 on the main shaft 1 and actuating the lay B and connected parts. The part of the frame marked 8 is used to support the Jacquard mechanism.

Referring now to Figs. 3 and 4 it will be seen that I make the shaft F longitudinally movable in its bearings and attach the bowl levers G permanently to the said shaft. In the position shown in Fig. 3 the shaft is shifted so that the bowls are out of operative position with regard to the arms $E^2$ and it will be seen that when the shaft F is shifted to the right the bowls are brought into operative position—$f f$ indicating the journals of shaft F. $f'$ is a grooved collar secured on shaft F and engaging the end $p$ of a lever $p$ $p^2$; the opposite end of which is pivoted at $p'$, while at a point $p^3$ on said lever is attached the cord Q which, as in the former case, passes under a pulley Q' and connects as before with a bar S which bar, as in the former case, is attached to the swivel-shuttle-supporting bar though in the present case I have not thought it necessary to illustrate it. It will be seen of course that by the construction described the shifting of shaft F to the left will draw down the bar S and the parts connected with it. Connecting with the shaft F as before is a cam $M^{10} M^{11}$ though in the present construction the part $M^{10}$ is made longitudinally movable on the shaft F and the part $M^{11}$ permanently attached to it. The part $M^{10}$ by means of a grooved collar $M^3$ is engaged by a stationary finger T which holds it always in the same position while of course the part $M^{11}$ moves to or from the part $M^{10}$ as the shaft F is shifted. In this way the lever N is engaged and disengaged by the cam as the bowls are shifted out of or into operative position. Secured to the shaft F is a scroll cam U the construction of which can readily be followed in Figs. 3 and 4. It has two circular grooves $u$ and $u'$ connecting with which are the grooves $u^2$ and $u^3$ formed and arranged substantially as shown. Above this cam is a bracket $A^2$ to which is pivotally attached the lever V from each end of which depends a bolt marked respectively V' and $V^2$; these bolts are at a distance apart equal to the distance between the groove $u$ and the outer extremity of the groove $u^3$ and arranged with respect to cam U as shown. The lever V is operated by cords or chains $v v'$ which, in turn, are actuated by Jacquard mechanism or in any other convenient way.

When it is desired to shift the shaft F from the position shown in Fig. 3 the cord $v$ is drawn up shifting the position of lever V, drawing bolt V' out of groove $u$, and pushing bolt $V^2$ into groove $n^3$; the shaft continuing at all times to turn is, by reason of the shape of groove $U^3$, thrust to the right until the bolt $V^2$ reaches and remains in the groove $u'$; the movement of the shaft to the right brings the bowls into operative position, permits the beam S and its connected parts to rise and opens the cam $M^{10} M^{11}$. When it is desired to again disengage the bowls and bring the swivel-shuttle into operation it is done by drawing on the cords $v'$ which lifts the bolt $V^2$ and depresses the bolt V'—the last-mentioned bolt engaging in the groove $u^2$ and, after shifting the shaft to the left, in the grooves $u$.

Having now described my invention, what I claim as new, and desire to secure by Letters Patent, is—

1. In a loom, having pick-levers for actuating the ground shuttle or shuttles, the combination with said pick-levers of mechanism for actuating the same, made adjustable, out of and into operative connection with the pick-levers; the swivel shuttle supporting bar normally held above the shed, and mechanism for drawing and holding said bar into operative position, and a longitudinally movable rod connected with the actuating mechanism for the pick-levers and for the said supporting bar as described, and so that by shifting said rod, the swivel shuttle supporting bar is drawn and held into operative position for two or more consecutive picks, at the same time that the pick-lever actuating mechanism is moved and held out of operative position.

2. In a loom the shaft F in combination with bowl carrying levers longitudinally movable on but turning with said shaft, the bowl shifting rod L, mechanism connecting said rod with the bowl levers as described and so as to shift them longitudinally on shaft F, the swivel shuttle supporting bar R, a lever P $P^2$ actuated by the rod L, and connections from said lever to bar R all substantially as described and so that the bar is drawn down and held in operative position by the movement of rod L to shift the bowls out of operative position.

OTTO W. SCHAUM.

Witnesses:
A. H. RITTER,
JOSHUA MATLACK, Jr.